(No Model.)
W. S. McKINNEY.
STOP MOTION.
No. 356,847. Patented Feb. 1, 1887.
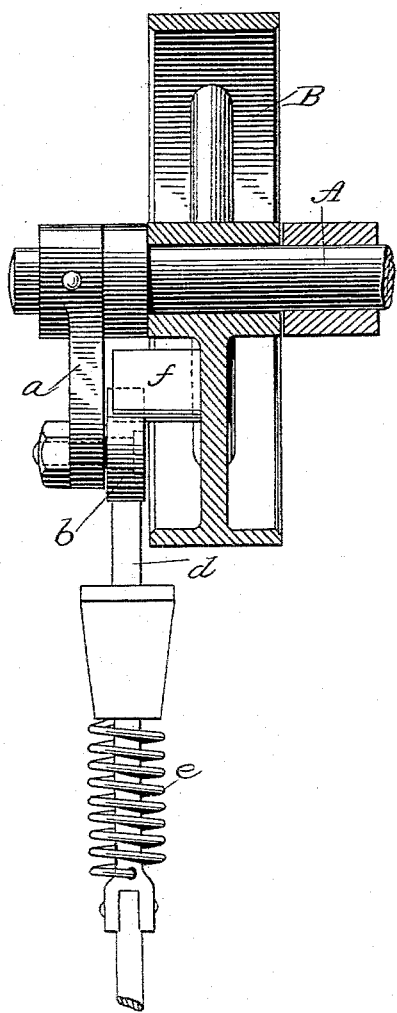
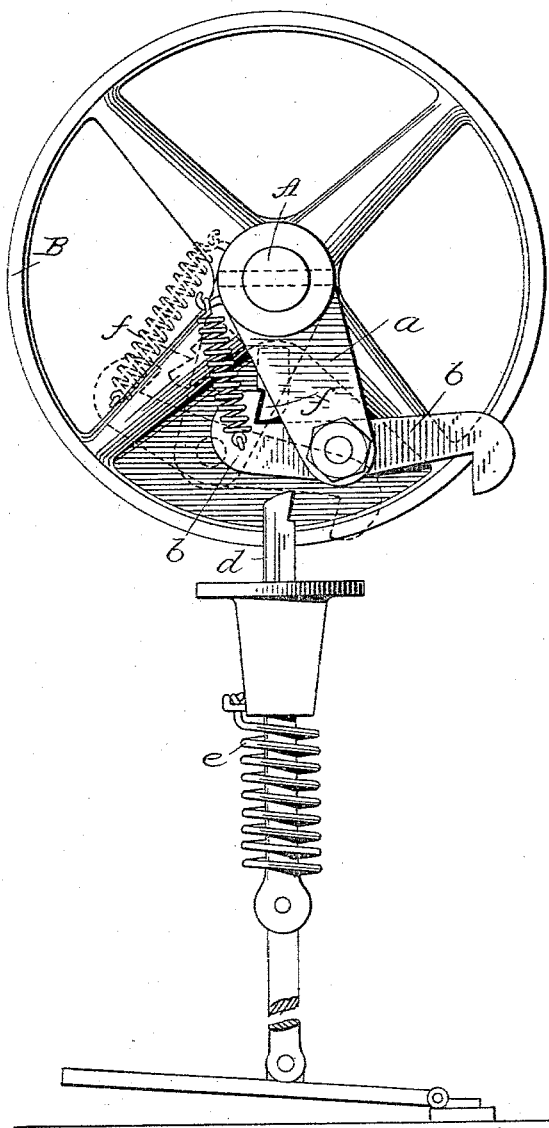

UNITED STATES PATENT OFFICE.

WALTER S. McKINNEY, OF BINGHAMTON, NEW YORK.

STOP-MOTION.

SPECIFICATION forming part of Letters Patent No. 356,847, dated February 1, 1887.

Application filed March 16, 1886. Serial No. 195,476. (No model.)

*To all whom it may concern:*

Be it known that I, WALTER S. McKINNEY, of Binghamton, in the county of Broome and State of New York, have invented a new and useful Improvement in Stop-Motions; and I do hereby declare that the following is a full, clear, and exact description of the same.

My invention is an improved device for interrupting the motion of machinery.

The object of the invention is to provide a simple and effective device for stopping the motion of machinery automatically without jarring and to allow it to be started again by the action of the operator.

In the accompanying drawings, Figure 1 represents an end elevation of the driving-shaft with a pulley in side elevation, the parts being shown in one position in full lines and in the other position in dotted lines. Fig. 2 is a side elevation of the shaft, representing the parts out of connection with each other.

In the drawings, A represents a shaft to which power is applied to drive the machinery to which it is connected, and B represents the main driving-pulley. This pulley is loose upon the shaft A and runs freely, except as hereinafter explained. The pulley has its bearing a short distance from the end of the shaft, and between this point and the end is keyed or otherwise rigidly secured an arm, $a$. Upon the lower end of this arm is a pivoted hooked lever, $b$, which has a long and short arm, both terminating in hooked ends, the hooks being in reversed direction. A spring, $c$, is secured upon a pin at one end to the arm $a$ and at the opposite end is fastened to the short arm of the lever $b$, thus placing the lever under spring tension, keeping the short arm drawn up, except under the conditions hereinafter explained.

A projecting stud, $d$, has its upper bearings in a suitable slide secured in any suitable position to the frame-work of the machine, but in a certain relation to the hooked lever $b$. The lower end is connected to a treadle so located that it may be in reach of the foot of the operator. A spring, $e$, is connected at one end to the frame-work in which the stud slides and at the other to the slide itself, so that a constant upward pressure is applied to the stud. This tension being overcome depresses the stud when the operator uses the treadle.

Projecting from one of the spokes of the pulley, or from a web between the spokes, as shown, is a projection, $f$, which, as shown in Fig. 2, extends out in the path of the short arm of the hooked lever, and when the stud $e$ is depressed the power applied to the pulley through the ordinary belt will be communicated to the shaft and the machine connected thereto by reason of the projection $f$ coming in contact with the hooked end of the lever $b$, which is held in its path by means of the spring $c$, and the shaft will thus be revolved with the pulley, as the arm $a$ is rigidly secured to the said shaft.

If pressure is removed from the treadle and the stud $d$ is in its normal condition in the movement of the parts, the long arm of the lever $b$ will come into contact just below its pivotal point with the rounded end of the stud $d$, which will throw up the long arm of the said lever, depress the short arm against the pressure of the spring $c$, which thus removes it from the path of the projection $f$, so that in the continued movement of the pulley the projection will pass by above the short arm of the lever $b$ and the shaft will remain stationary, the pulley alone moving. So long as the stud is in its normal condition and in engagement with the long arm of the lever $b$ the power of the pulley will not be applied to the shaft, but will simply run loose upon said shaft. When, however, it is desired to have the shaft rotate, the operator simply depresses the stud $d$, when the spring $c$ will exert its force and return the short arm of the lever into the path of the projection $f$, and when the pulley reaches this point it will revolve the shaft as before.

I claim as my invention—

1. In combination with a shaft and a loose pulley mounted thereon, the arm secured to said shaft carrying a hooked lever, a projection on said pulley adapted to engage with one of the hooked ends of said lever, and a stud carried upon the frame adapted to engage with the opposite end of said lever, substantially as described.

2. In combination with a shaft, an arm fixed thereto carrying a pivoted lever, a driving-pulley mounted loosely upon said shaft and having a projection extending outward and adapted to engage with one of the ends of said hooked lever, a spring for keeping said lever in the path of said projection, and a stud under tension adapted to engage with the opposite end of said lever and to withdraw the short arm thereof out of the path of the projection on the pulley, substantially as described.

3. In combination, a shaft, an arm secured thereto, a lever pivoted upon the end of said arm having hooks at each end, a pulley mounted loosely on said shaft having a projection extending out and adapted to engage with one of the hooked ends of said lever, a spring for keeping said lever in the path of said projection, a stud held under tension and adapted to engage with the opposite end of said lever, and a treadle connected therewith for keeping it out of engagement with the said lever, substantially as described.

In testimony whereof I have signed my name to this specification in the presence of two subscribing witnesses.

WALTER S. McKINNEY.

Witnesses:
 D. H. CARVER,
 ISRAEL T. DEYO.